US008304675B2

(12) United States Patent
Hsu

(10) Patent No.: US 8,304,675 B2
(45) Date of Patent: Nov. 6, 2012

(54) MATRIX TOUCH PANEL

(75) Inventor: Jane Hsu, Guishan Township (TW)

(73) Assignee: Minlead Ltd., Taipei (TW)

( * ) Notice: Subject to any disclaimer, the term of this patent is extended or adjusted under 35 U.S.C. 154(b) by 333 days.

(21) Appl. No.: 12/838,443

(22) Filed: Jul. 17, 2010

(65) Prior Publication Data

US 2011/0048914 A1    Mar. 3, 2011

(30) Foreign Application Priority Data

Aug. 25, 2009    (TW) .............................. 98215638 U

(51) Int. Cl.
G06F 3/041    (2006.01)
(52) U.S. Cl. ........................................ 200/512; 345/173
(58) Field of Classification Search .......... 200/512–517; 345/156, 172, 173
See application file for complete search history.

(56) References Cited

U.S. PATENT DOCUMENTS

| | | | | |
|---|---|---|---|---|
| 6,677,542 B2 * | 1/2004 | Katakami | ..................... | 200/5 A |
| 7,439,466 B2 * | 10/2008 | Yamaue et al. | ............... | 200/512 |
| 7,633,564 B2 * | 12/2009 | Hong et al. | ..................... | 349/12 |
| 8,049,127 B2 * | 11/2011 | Yamaue et al. | ............... | 200/512 |
| 2010/0007624 A1 * | 1/2010 | Jiang et al. | .................... | 345/173 |

* cited by examiner

Primary Examiner — Amy Cohen Johnson
Assistant Examiner — Marina Fishman
(74) Attorney, Agent, or Firm — Hershkovitz & Associates LLC; Abe Hershkovitz

(57) ABSTRACT

A matrix touch panel has an upper panel, a separation layer, an insulation layer and a lower panel. The lower panel has a plurality of first transparent electrodes on a bottom intersected by a plurality of second transparent electrodes on the upper panel. A plurality of wires and leading lines are formed on a border of the upper and lower panels. One terminal of each wire is connected to one end of the corresponding first or second transparent electrode, and the other terminal is connected with a corresponding leading line. One end of the first and second transparent electrode corresponding to the wires has an inner lead and an outer lead. The outer lead is electrically connected with the wires. An area defined between the inner lead and the outer lead varies to generate different impedance to balance the impedance difference among the wires with different lengths.

6 Claims, 6 Drawing Sheets

MATRIX TOUCH PANEL

BACKGROUND OF THE INVENTION

1. Field of the Invention

The present invention is related to a matrix touch panel, and more particularly to a matrix touch panel balancing impedance variation caused by wire difference.

2. Description of the Related Art

Basic concept of matrix touch panels is similar to that of capacitive touch panel. Their difference lies in that transparent electrode layers of the matrix touch panels are etched and divided into a plurality of separated and juxtaposed transparent electrodes and the transparent electrodes on the upper panel and the transparent electrodes on the lower panel are perpendicularly intersected like rows and columns of a matrix. Each of the intersections of the transparent electrodes constitutes a capacitive switch generating variation of capacitance when touched. Such variation of capacitance can be further used to determine where coordinates of a touched intersection are located. Detailed structure of conventional matrix touch panels is disclosed further as follows:

With reference to FIG. 4, a matrix touch panel has a lower panel 70, an upper panel 80, an insulation layer 90 and a separation layer.

The lower panel 70 is made of glass. With reference to FIG. 5, the lower panel 70 is rectangular and has two long edges, two short edges, a transparent electrode layer, a plurality of wires 72 and a plurality of leading lines 73. The transparent electrode layer is etched and divided into a plurality of separated and juxtaposed first transparent electrodes 71 being parallel to the long edges and respectively having two ends. The wires 72 are divided into two sets and made of silver paste. The two sets of the wires 72 are symmetrically L-shaped and are formed on and alongside the two short edges respectively and one of the long edges simultaneously. The leading lines 73 are formed on a center portion of the long edge having the wires formed thereon and are formed by a plurality of electrical connection terminals. One terminal of each electrical connection terminal is connected with one terminal of the corresponding wire 72, and the other terminal of the wire 72 is connected to the corresponding end of the corresponding first transparent electrode 71. Hence, signals generated by the first transparent electrodes 71 can be sent out through the wires 72 and the leading lines 73.

The upper panel 80 structurally resembles the lower panel 70 except taking a form of a film. With reference to FIG. 6, the upper panel 80 is rectangular and has a bottom, two long edges, two short edges, a plurality of second transparent electrodes 81, a plurality of wires 82 and a plurality of leading lines 83. The second transparent electrodes 81 are separately and juxtaposedly formed on the bottom of the upper panel 80, are parallel to the short edges, respectively have two ends, and are perpendicularly overlapped on the first transparent electrodes 71 in the form of columns and rows of a matrix. The wires 82 are divided into two sets and made of silver paste. The two sets of the wires 82 are symmetrically U-shaped and are formed on and alongside one of the two long edges simultaneously, the two short edges respectively and the other of the two long edges simultaneously. The leading lines 83 are formed on a center portion of the long edge having the wires 82 formed thereon to correspond to the leading lines 73 and are formed by a plurality of electrical connection terminals. One terminal of each electrical connection terminal is connected with one terminal of the corresponding wire 82, and the other terminal of the wire 82 is connected to the corresponding end of the corresponding second transparent electrode 81. Hence, signals generated by the second transparent electrodes 81 can be sent out through the wires 82 and the leading lines 83.

The insulation layer 90 is frame-shaped, has a size matching that of the lower panel 70 and the upper panel 80, and is mounted between the upper panel 80 and the lower panel 70 to insulate the upper panel 80 from the lower panel 70.

The separation layer is formed by a plurality of spacers 91 located within the insulation layer 90 and distributed between the upper panel 80 and the lower panel 70 so as to form a gap between the upper panel 80 and the lower panel 70 before being touched.

The leading lines 73, 83 on the lower panel 70 and the upper panel 80 serve to connect with a flexible flat cable so that the touch panel is connected to a controller through the flexible flat cable. In other words, each transparent electrode 71 on the lower panel 70 and each transparent electrode 81 on the bottom of the upper panel 80 are connected with the external controller through the corresponding wires 72, 82, leading lines 73, 83 and the flexible flat cable. Based on the impedance-balancing concept, the leading lines 73, 83 are respectively located on center portions of the corresponding long edges of the lower panel 70 and the upper panel 80, ensuring that distances of the wires 72, 82 to the leading lines 73, 83 are roughly the same. Practically, the distances from the wires 72, 82 to the leading lines 73, 83 are hardly the same and there may be considerable differences among them. The reason is attributable to that original distances from the first and second transparent electrodes 71, 81 to the leading lines 73, 83 are already different. Hence, lengths of the wires 72, 82 in connection with the first and second transparent electrodes 71, 81 and the leading lines 73, 83 are also different. Given the lower panel 70 as an example, the first transparent electrodes 71 thereon are aligned transversely. The higher the first transparent electrode is located, the longer the distance between the first transparent electrode and the leading line 73. Such difference makes the wire 72 longer when the wire 72 is connected with the leading line 73 and the higher first transparent electrode 71, and shorter when the wire 72 is connected with the leading line 73 and the lower first transparent electrode 71. As the impedance value of the wire 72 is proportional to the length thereof, various wire impedance values exist between the first transparent electrodes 71 and the leading lines 73 and very likely result in erroneous determination of the location being touched.

Accordingly, to ensure the location-reading accuracy, the impedance variation of the wires should be tackled and further refined.

SUMMARY OF THE INVENTION

An objective of the present invention is to provide a matrix touch panel balancing impedance variation caused by wire difference.

To achieve the foregoing objective, the matrix touch panel has a lower panel, an upper panel, an insulation layer and a separation layer.

The lower panel has a surface, a plurality of first transparent electrodes, a plurality of leading lines and a plurality of wires.

The surface has a border. The plurality of first transparent electrodes are separately and juxtaposedly formed on the surface, and each has two ends and two transmission portions. The two first transmission portions are respectively formed on the two ends, and each has an area. The plurality of leading lines are formed on the border of the surface and composed of a plurality of electrical connection terminals. The plurality of wires are formed on and alongside the border of the surface, and each has two terminals respectively connected with one end of the corresponding first transparent electrode through the corresponding first transmission portion of the corresponding first transparent electrode and with the corresponding electrical connection terminal. The area of each of the first transmission portion is proportional to a length of the corresponding wire connected therewith.

The upper panel has a bottom, a plurality of second transparent electrodes, a plurality of leading lines and a plurality of wires. The bottom has a border. The plurality of second transparent electrodes are separately and juxtaposedly formed on the bottom and perpendicularly overlapped on the plurality of first transparent electrodes, and each has two ends and two second transmission portions. The two second transmission portions are respectively formed on the two ends of the corresponding second transparent electrode, and each has an area. The plurality of leading lines are formed on the border of the bottom and composed of a plurality of electrical connection terminals. The plurality of wires are formed on and alongside the border of the bottom, and each has two terminals respectively connected with one end of the corresponding second transparent electrode through the corresponding second transmission portion of the corresponding second transparent electrode and with the corresponding electrical connection terminal of the upper panel. The area of each of the second transmission portion is proportional to a length of the corresponding wire connected therewith.

The insulation layer is frame-shaped and is mounted between the upper panel and the lower panel to insulate the upper panel from the lower panel.

The separation layer has a plurality of spacers located between the insulation layer and distributed between the upper panel and the lower panel.

The matrix touch panel of the present invention is characterized in having the area defined between the inner lead and the outer lead and varying to generate different impedance so as to balance the impedance difference among the wires with different lengths and enhance the coordinate-determining accuracy.

DETAILED DESCRIPTION OF THE INVENTION

Figure 1:
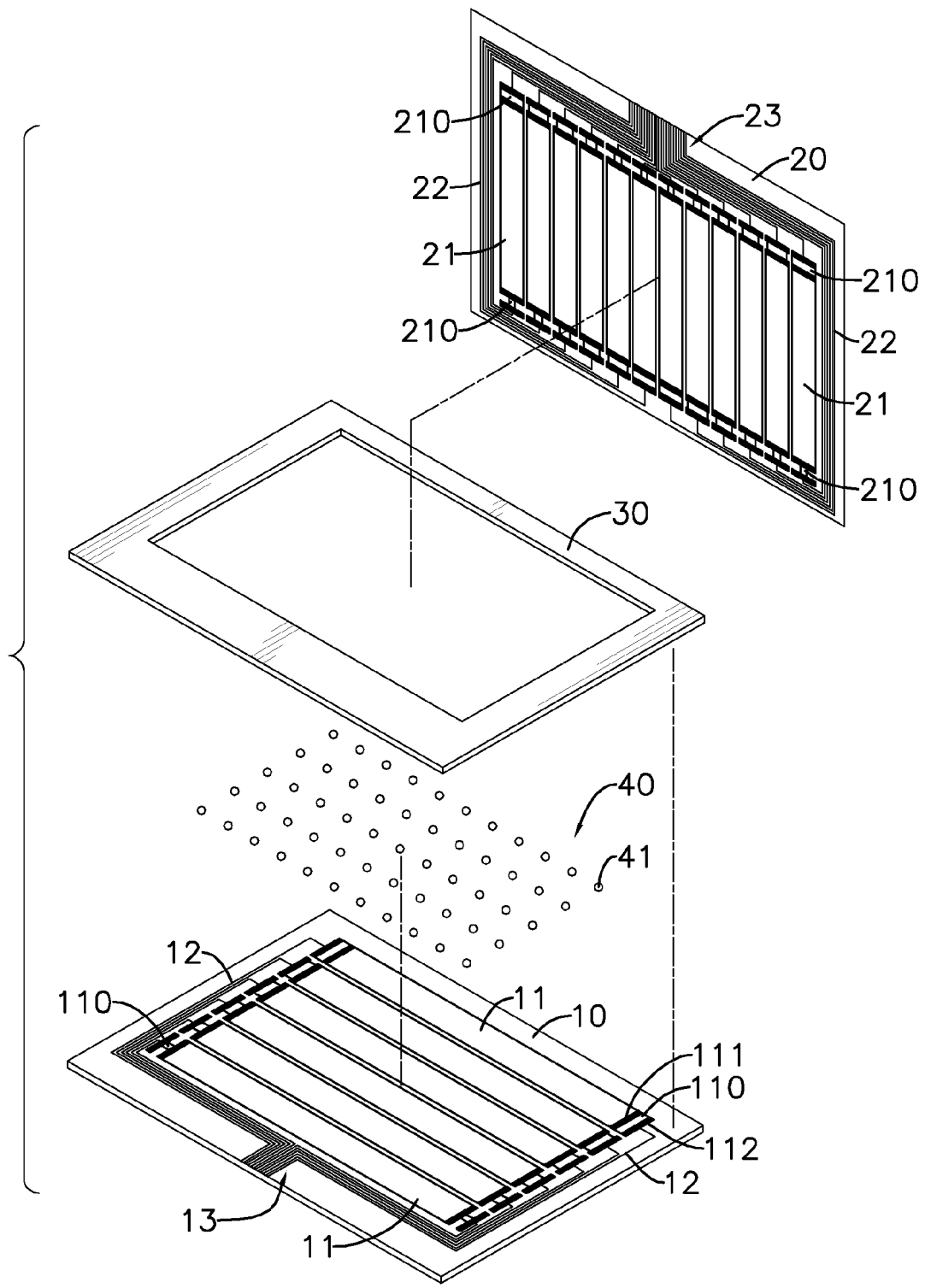
FIG. 1 is an exploded perspective view of a matrix touch panel in accordance with the present invention.

With reference to FIG. 1, a matrix touch panel in accordance with the present invention has a lower panel 10, an upper panel 20, an insulation layer 30 and a separation layer 40. The upper panel 20 and the lower panel 10 are oppositely mounted, and the insulation layer 30 and the separation layer 40 are mounted between the upper panel 20 and the lower panel 10.

Figure 2:
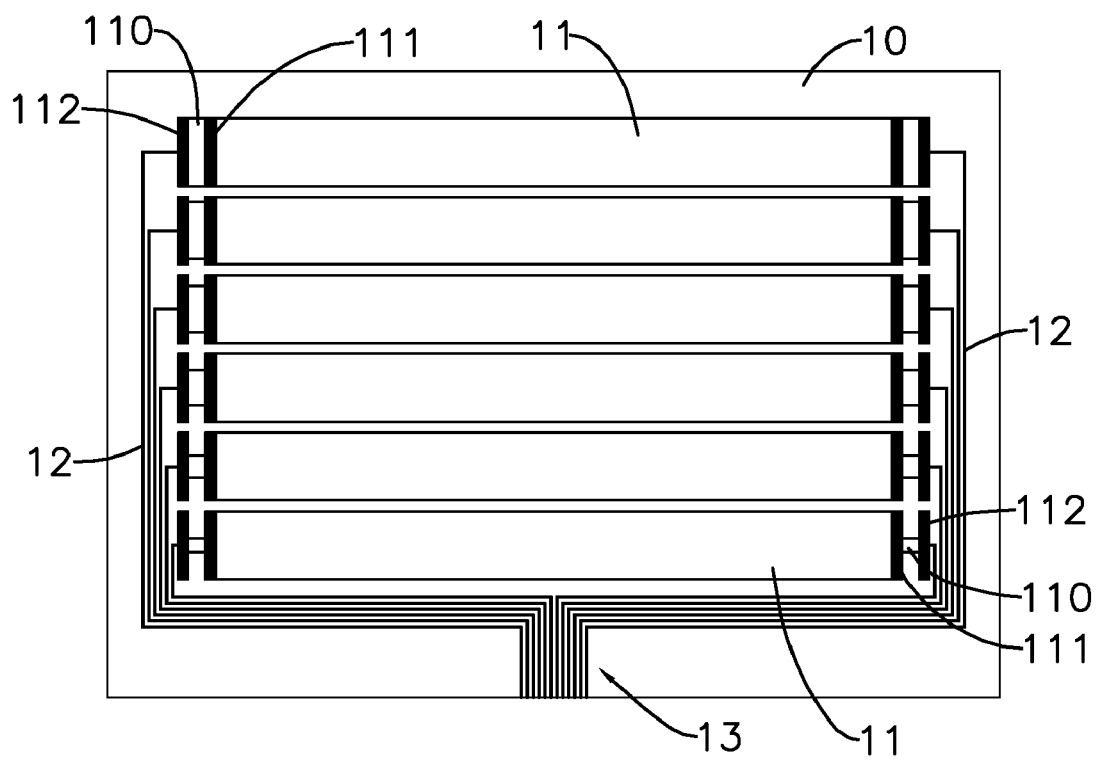
FIG. 2 is a plain view of a lower panel of the matrix touch panel in FIG. 1.

With reference to FIG. 2, the lower panel 10 is rectangular and has a surface, two short edges, two long edges, a plurality of first transparent electrodes 11, a plurality of wires 12 and a plurality of leading lines 13. The plurality of first transparent electrodes 11 are separately and juxtaposedly formed on the surface by first forming an ITO (Indium Tin Oxide) layer on the surface and etching the ITO layer to form multiple transverse channels so as to divide the ITO layer into the plurality of independent first transparent electrodes 11. In the present embodiment, all first transparent electrodes 11 are transversely (X-axis) juxtaposed.

The plurality of wires 12 are divided into two sets and made of silver paste. The two sets of the wires 12 are symmetrically L-shaped and are formed on and alongside the two short edges respectively and one of the two long edges simultaneously. The number of the wires 12 depends on the number of the first transparent electrodes 11. For example, if there are six first transparent electrodes 11 on the surface of the lower panel 10, totally, six wires 12 are formed on the lower panel 10. The plurality of leading lines 13 are formed on a center portion of the long edge having the wires 12 formed thereon and are formed by a plurality of electrical connection terminals. One terminal of each of electrical connection terminals is connected with one terminal of the corresponding wire 12, and the other terminal of the wire 12 is connected to one end of the corresponding first transparent electrode 11.

Each of the first transparent electrodes 11 further has two first transmission portions 110 and is connected with one terminal of the corresponding wire 12 through the corresponding first transmission portion 110. The first transmission portion 110 of the first transparent electrode 11 has an area varying in accordance with a length of the wire 12 connected therewith. Specifically, the area of the first transmission portion 110 is proportional to the length of the wire 12 connected therewith. The longer the wire 12 is, the larger the area of the first transmission portion 110 is, indicating that an impedance value between the first transparent electrode 11 and the wire 12 connected therewith is lower. If the wire 12 between the corresponding first transparent electrode 11 and the corresponding leading line 13 is shorter, the area of the first transmission portion 110 is smaller and the impedance value is higher. Accordingly, flexibly adjusting the area of the first transmission portion 110 between each of the first transparent electrodes 11 and the corresponding wire 12 can generate equivalent or similar impedance for the wires 12 respectively connected with the first transparent electrodes 12.

Figure 2A:
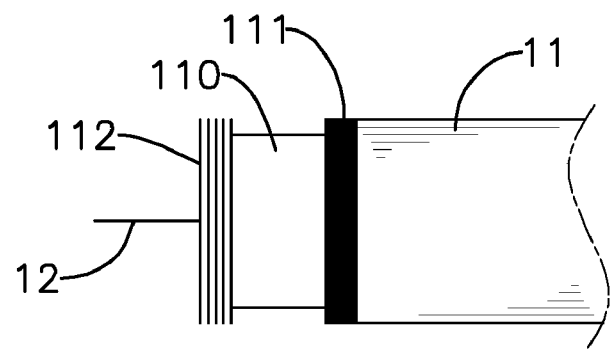
FIG. 2A is a partially enlarged plain view of the lower panel in FIG. 2.

The first transmission portion 110 is formed by a fraction of one end of the first transparent electrode 11 connected therewith. Each end of the first transparent electrode has an inner lead 111 and at least one outer lead 112 formed on the end with silver paste. The inner lead 111 and the at least one outer lead 112 are parallel to the short edges of the lower panel 10. With reference to FIG. 2A, a plurality of outer leads 112 are parallelly and separately mounted on each end of the first transparent electrode 11. The most inward outer lead 112 is located on one end of the first transparent electrode 11, and the most outward outer lead 112 is electrically connected with one terminal of the corresponding wire 12. Given the inner lead 111 and the outer leads 112 mounted on one end of the first transparent electrode 11, a first transmission portion 110 can be defined. Regarding how to obtain different area for the first transmission portion 110, it can be done by photolithography upon etching the ITO layer. Other than that, it can also be done after the etching process by partially scraping off the ITO layer on both ends of the first transparent electrode 11.

Figure 3:
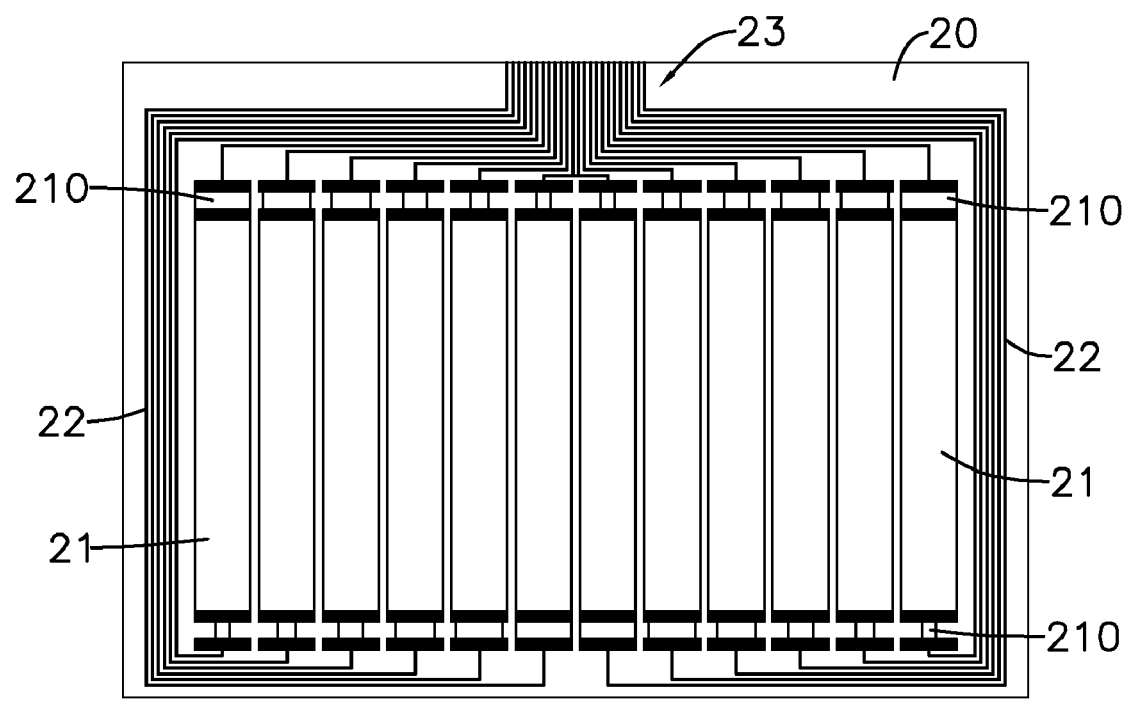
FIG. 3 is a plain view of an upper panel of the matrix touch panel in FIG. 1.
Figure 4:
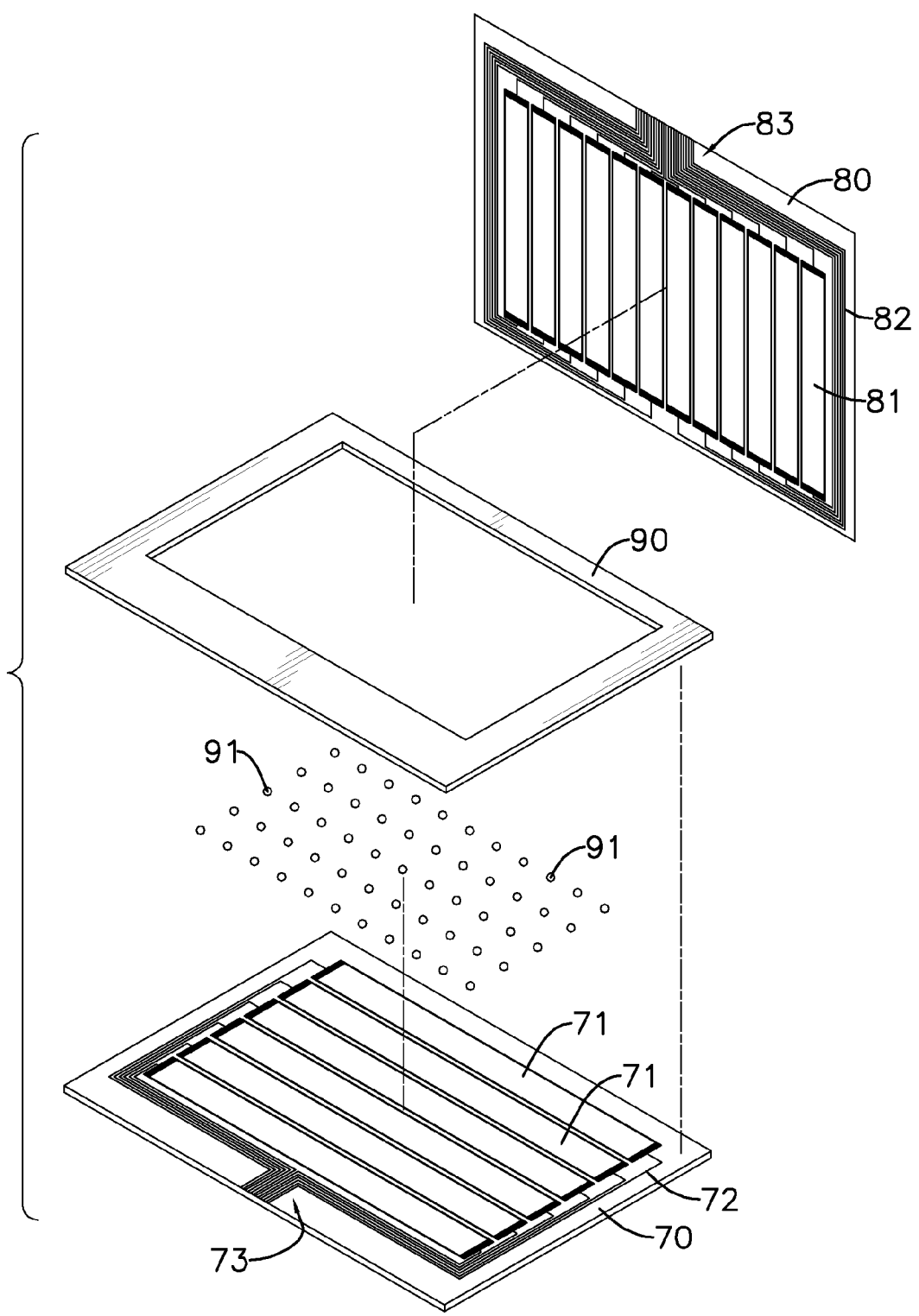
FIG. 4 is an exploded prospective view of a conventional matrix touch panel.
Figure 5:
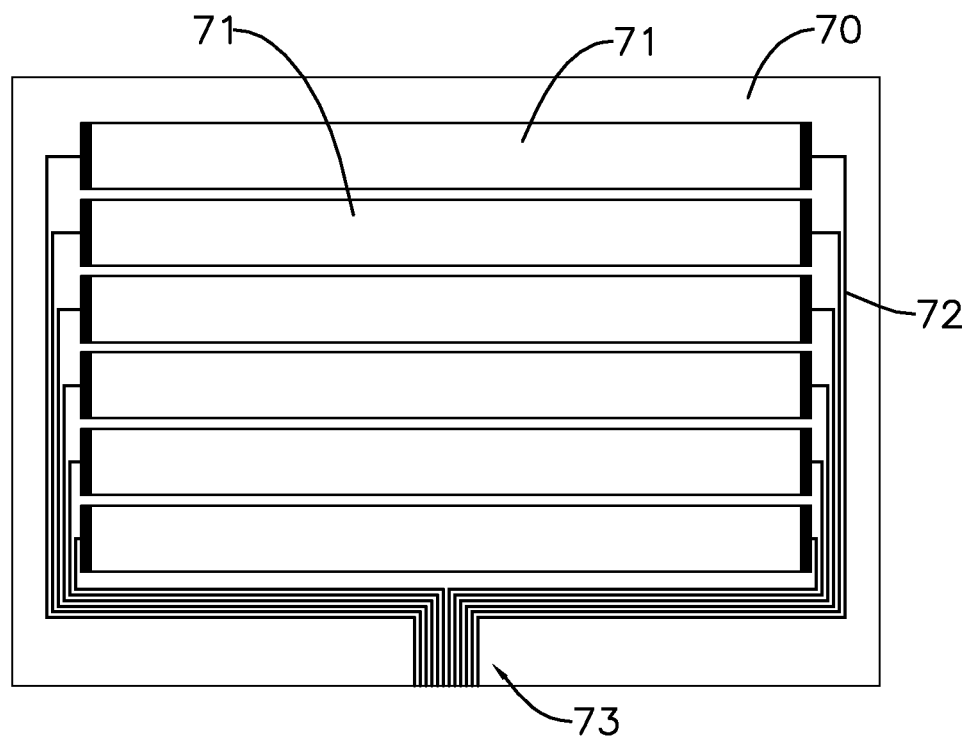
FIG. 5 is a plain view of a lower panel of the conventional matrix touch panel in FIG. 4.
Figure 6:
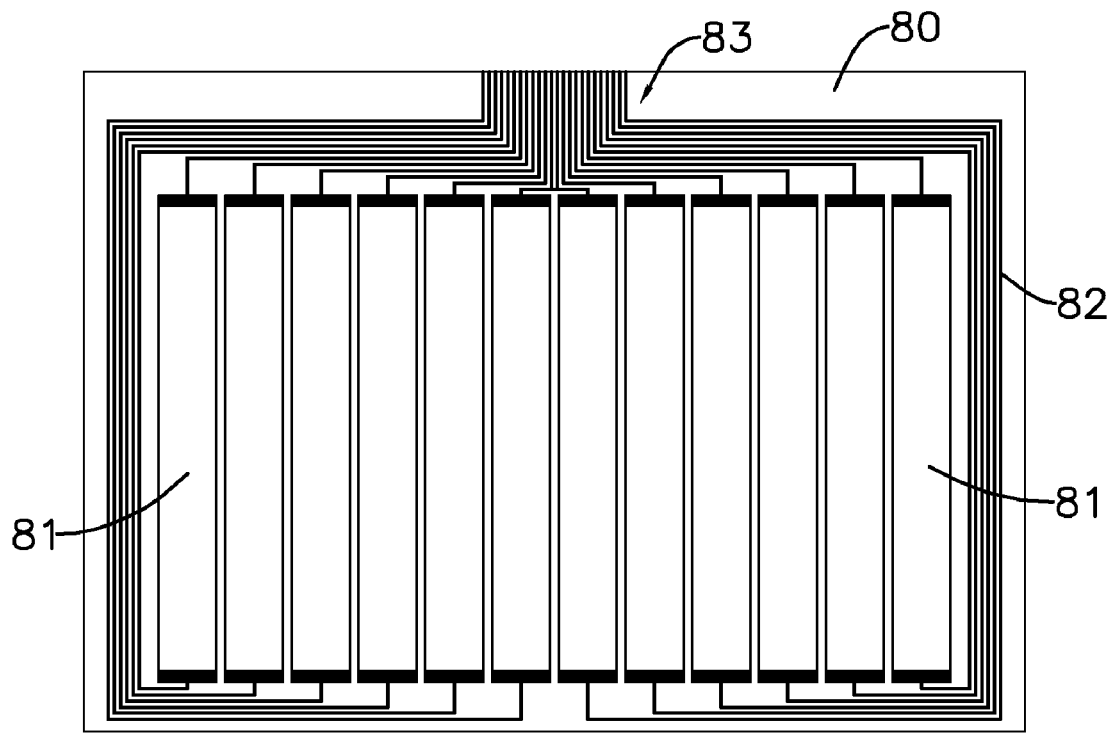
FIG. 6 is a plain view of an upper panel of the conventional matrix touch panel in FIG. 4.

With reference to FIGS. 1 and 3, the upper panel 20 is rectangular and has two long edges, two short edges, a plurality of second transparent electrodes 21, a plurality of wires 22 and a plurality of leading lines 23. The formation of the second transparent electrodes 21 is similar to that of the first transparent electrodes 11. The second transparent electrodes 21 are separately and juxtaposedly formed on the bottom of the upper panel 20, are parallel to the short edges (Y-axis), respectively have two ends, and are perpendicularly overlapped on the first transparent electrodes 11 in the form of columns and rows of a matrix. The wires 22 are divided into two sets and made of silver paste. The number of the wires 22 depends on the number of the second transparent electrodes 21. The two sets of the wires 22 are symmetrically U-shaped and are formed on and alongside one of the two long edges simultaneously, the two short edges respectively and the other of the two long edges simultaneously. The leading lines 23 of the upper panel 20 are formed on a center portion of the long edge on the top to correspond to the leading lines 13 of the lower panel 10 and are formed by a plurality of electrical connection terminals. One terminal of each electrical connection terminal is connected with one terminal of the corresponding wire 22, and the other terminal of the wire 22 is connected to the corresponding end of the corresponding second transparent electrode 21.

Each of the second transparent electrodes 21 further has two second transmission portions 210 and is connected with one terminal of the corresponding wire 22 through the corresponding second transmission portion 210. The second transmission portion 210 of the second transparent electrode 21 has an area varying in accordance with a length of the wire 22 connected therewith. Specifically, the area of the first transmission portion 210 is proportional to the length of the wire 22 connected therewith. The longer the wire 22 is, the larger the area of the second transmission portion 210 is, indicating that an impedance value between the second transparent electrode 21 and the wire 22 connected therewith is lower. If the wire 22 between the corresponding second transparent electrode 21 and the corresponding leading line 23 is shorter, the area of the second transmission portion 210 is smaller and the impedance value is higher. Accordingly, flexibly adjusting the area of the second transmission portion 210 between each of the second transparent electrodes 21 and the corresponding wire 22 can generate equivalent or similar impedance for the wires 22 respectively connected with the second transparent electrodes 22. The technique for forming the second transmission portion 210, which is the same as that for the first transmission portion 110, is not repeated here. The surface of the upper panel 20 can be further performed with hardening treatment.

The insulation layer 30 is frame-shaped, has a size matching that of the lower panel 10 and that of the upper panel 20, and is mounted between the upper panel 20 and the lower panel 10 to insulate the wires 22 on the upper panel 20 from the wires 12 on the lower panel 10. The separation layer 40 is formed by a plurality of spacers 41 located within the insulation layer 30 and distributed between the upper panel 20 and the lower panel 10. Preferably, the plurality of spacers are located around a place intersected by the first and second transparent electrodes 11, 21 and having no ITO layer formed thereon.

The matrix touch panel of the present invention has the first transmission portion 110 formed on both ends of each of the first transparent electrode 11 of the lower panel 10 and the second transmission portion 210 formed on both ends of each of the second transparent electrode 21. The areas of the first and second transmission portions 110, 210 are proportional to the length of the corresponding circuits connected therewith, thereby adjusting the impedance of the wires having different length to be consistent and to further ensure accuracy in reading coordinates of the matrix touch panel.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A matrix touch panel, comprising:
   a lower panel having:
      a surface having a border;
      a plurality of first transparent electrodes separately and juxtaposedly formed on the surface, each having:
         two ends; and
         two first transmission portions respectively formed on the two ends, each having an area;
      a plurality of leading lines formed on the border of the surface and composed of a plurality of electrical connection terminals; and
      a plurality of wires formed on and alongside the border of the surface, each having two terminals respectively connected with one end of the corresponding first transparent electrode through the corresponding first transmission portion of the corresponding first transparent electrode and with the corresponding electrical connection terminal, wherein the area of each of the first transmission portion is proportional to a length of the corresponding wire connected therewith;
   an upper panel having:
      a bottom having a border;
      a plurality of second transparent electrodes separately and juxtaposedly formed on the bottom and perpendicularly overlapped on the plurality of first transparent electrodes, each having:
         two ends; and
         two second transmission portions respectively formed on the two ends of the corresponding second transparent electrode, each having an area;
      a plurality of leading lines formed on the border of the bottom and composed of a plurality of electrical connection terminals; and
      a plurality of wires formed on and alongside the border of the bottom, each having two terminals respectively connected with one end of the corresponding second transparent electrode through the corresponding second transmission portion of the corresponding second transparent electrode and with the corresponding electrical connection terminal of the upper panel, wherein the area of each of the second transmission portion is proportional to a length of the corresponding wire connected therewith;
   an insulation layer being frame-shaped and mounted between the upper panel and the lower panel to insulate the upper panel from the lower panel; and
   a separation layer having a plurality of spacers located within the insulation layer and distributed between the upper panel and the lower panel.

2. The matrix touch panel as claimed in claim 1, wherein the first transmission portion has an inner lead and an outer lead formed on each end of the first transparent electrode with silver paste, wherein the outer lead and the inner lead are located on one end of the first transparent electrode and separated by a gap to form the first transmission portion, and the outer lead is electrically connected with one terminal of the corresponding wire; and the second transmission portion has an inner lead and an outer lead formed on each end of the second transparent electrode with silver paste, wherein the outer lead and the inner lead are located on one end of the second transparent electrode and separated by a gap to form the second transmission portion, and the outer lead of the second transmission portion is electrically connected with one terminal of the corresponding wire.

3. The matrix touch panel as claimed in claim 2, wherein the first transmission portion has a plurality of outer leads parallelly and separately mounted on each end of the first transparent electrode, the most inward outer lead is located on one end of the first transparent electrode, and the most outward outer lead is electrically connected with one terminal of the corresponding wire; and the second transmission portion has a plurality of outer leads parallelly and separately mounted on each end of the second transparent electrode, the most inward outer lead of the second transmission portion is located on one end of the second transparent electrode, and the most outward outer lead of the second transmission portion is electrically connected with one terminal of the corresponding wire.

4. The matrix touch panel as claimed in claim 1, wherein the plurality of spacers of the separation layer are located around places intersected by the first transparent electrodes and the second transparent electrodes.

5. The matrix touch panel as claimed in claim 2, wherein the plurality of spacers of the separation layer are located around places intersected by the first transparent electrodes and the second transparent electrodes.

6. The matrix touch panel as claimed in claim 3, wherein the plurality of spacers of the separation layer are located around places intersected by the first transparent electrodes and the second transparent electrodes.

* * * * *